No. 621,601. Patented Mar. 21, 1899.
J. CONLEY.
GARBAGE RECEPTACLE.
(Application filed Nov. 17, 1898.)

(No Model.)

WITNESSES
G. S. Elliott.
H. H. Johnson.

INVENTOR
Joseph Conley
by Eugene W. Johnson
Attorney

UNITED STATES PATENT OFFICE.

JOSEPH CONLEY, OF MOUND CITY, MISSOURI.

GARBAGE-RECEPTACLE.

SPECIFICATION forming part of Letters Patent No. 621,601, dated March 21, 1899.

Application filed November 17, 1898. Serial No. 696,656. (No model.)

*To all whom it may concern:*

Be it known that I, JOSEPH CONLEY, a citizen of the United States, residing at Mound City, in the county of Holt and State of Missouri, have invented new and useful Improvements in Garbage-Receptacles, of which the following is a specification.

This invention relates to certain new and useful improvements in garbage-receptacles; and the object of the invention is to provide a garbage vessel or container of such a construction that the garbage or refuse which may be placed therein will be separated the solid from the liquid, so that the solid material will be in a condition to be cremated; and with such a primary end in view my improvement consists in the combination of two cylindrical vessels, the upper one having near its lower end a foraminous or reticulated bottom, which is removably attached to the lower portion of the upper vessel, resting upon an inwardly-projecting circumferential flange, the lower portion of the upper vessel having formed below its inwardly-projecting circumferential flange a downward extension of less diameter than the diameter of the part of the vessel above, so that the upper vessel may be supported upon the lower one and a single top or cover used for both receptacles.

The invention also embodies means for connecting the vessels together and holding the cover thereon.

This invention is designed particularly as a garbage-receptacle for domestic use, though the same is particularly adapted by reason of its construction for use in army-camps or other such places where it is desirable for sanitary reasons to cremate the garbage and offal.

Figure 1:
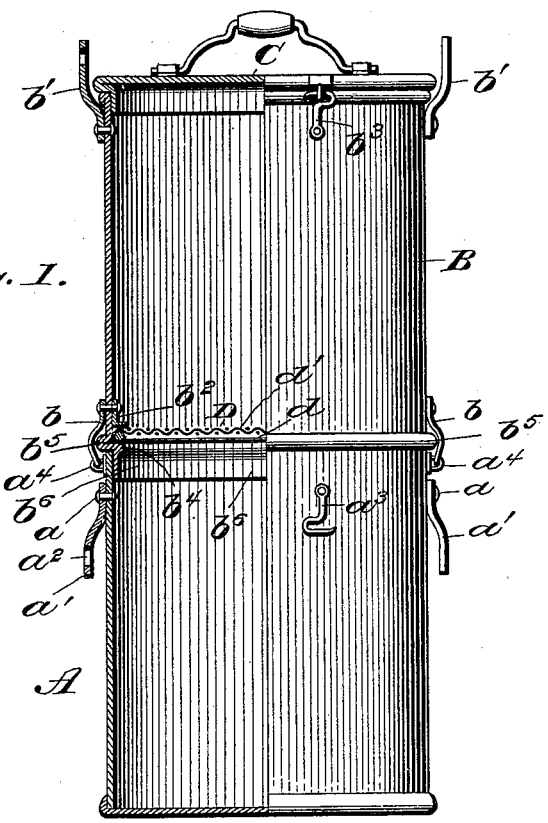
Figure 2:
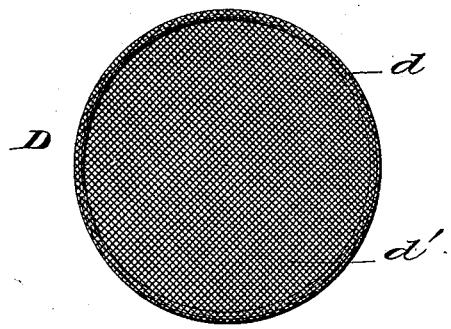

In the accompanying drawings, Figure 1 is a side elevation, one-half being in section. Fig. 2 is a plan view of the straining plate or disk detached.

Referring to the drawings, A is the lower metallic vessel, preferably made of galvanized iron, to which are attached, by rivets $a$ $a$, handles $a'$, which have therethrough apertures $a^2$, the handles being bent outwardly from a point adjacent to where they are attached to the vessel, so that when turned upwardly the apertures in the handles will be above the upper rim of the vessel or liquid-container A.

$a^3$ refers to hooks attached to the liquid-container A for the purpose of retaining a cover thereon, as will be hereinafter set forth. Near the upper edge the vessel A has rigidly-attached eyes $a^4$.

The upper vessel B is of the same external diameter as the lower vessel or liquid-container and has attached near its upper edge pivoted handles $b'$ and hooks $b^3$, which are the same in construction as those attached to the lower vessel, the hooks $b^3$ being intended to engage with eyes attached to a cover C, said cover having a swinging handle and a depending flange adapted to fit within either the upper or lower vessel. To the lower part of the vessel B are attached hooks $b$, which are connected to the vessel by rivets, the rivets retaining in place swinging hooks or turn-buttons $b^2$, located on the interior of the vessel, above the inwardly-projecting flange $b^4$ thereof. The lower portion of the receptacle B is so constructed as to provide an outwardly-projecting bead $b^5$, a horizontal flange $b^4$, and a depending portion $b^6$, which is of the same external diameter as the interior diameter of the vessel A. This specific form of construction admits of the cover being used on either vessel, forms a rest for the strainer, and allows the upper vessel to be placed upon the lower one.

D refers to a strainer, preferably made up of a ring $d$, which has soldered or otherwise secured thereto a wire fabric $d'$, and this strainer is placed within the vessel B, so as to rest upon the flange $b^4$ thereof. Prior to placing the strainer in position the hooks $b^2$ are turned upward, and when the ring $d$ is seated upon the flange the hooks $b^2$ are turned and serve to hold the strainer in intimate connection with the flange $b^4$. It will be noted that the depending flange $b^6$ extends considerably below the strainer D, so that the upper vessel or receptacle may be placed upon the ground without endangering the strainer or disk.

The vessel when assembled as shown in Fig. 1 of the drawings is ready for use, and when the cover is removed the garbage may be placed in the upper vessel and, resting upon a foraminous or reticulated disk, the liquids will find their way to the lower vessel. When the upper receptacle has been filled with solid matter, the hooks are separated from the eyes and a bar is passed through the handles $b'$, the cover of the upper vessel being taken off to serve as a cover for the lower one. The vessel B can be carried to a crematory or dumped into a specially-constructed vehicle. When the lower vessel is filled or partially filled with liquid refuse, the same may be readily disinfected within the vessel or carried to a distant point therein.

When the receptacles or vessels are not used for the purpose of receiving garbage, they may be utilized for other purposes, as storage vessels for camp cooking utentsils, tent-pins, and the like, and form convenient packing vessels, which when used for such purposes are not only fastened together by the hooks shown, but also by ropes which connect the handles of one of the vessels to the handles of the other.

I am aware that prior to my invention garbage vessels have been constructed with a view of separating the solid from the liquid matter, one of the vessels having a perforated bottom, and I do not claim such invention broadly; but

What I claim as new, and desire to secure by Letters Patent, is—

1. In a garbage-bucket, a vessel having adjacent to its upper edge outwardly-projecting eyes, pivoted handles and hooks, in combination with a receptacle constructed so that the lower part thereof will fit within the lower vessel and be supported thereby, a strainer carried by the upper receptacle, hooks for engagement with the eyes which project from the lower vessel, handles and hooks attached to the upper portion of the receptacle; together with a cover having projecting eyes which are adapted to be engaged by the hooks attached to either the upper or lower parts of the garbage-bucket, substantially as shown and for the purpose set forth.

2. In a garbage-receptacle the combination with a vessel A having handles, eyes and hooks, of a vessel B of the same diameter as the vessel A, said vessel B having formed above its bottom a bead and horizontal flange from which depends a vertical flange of less diameter than the body portion of the vessel, and a strainer carried by the vessel B and held in engagement with the flange thereof by turn-buttons, hooks attached to the vessel for engagement with the eyes of the vessel beneath, handles attached to the upper edges of the vessels, the handles being in swinging or pivoted engagement with the side walls of the vessels, substantially as shown and for the purpose set forth.

In testimony whereof I have hereunto set my hand in presence of two subscribing witnesses.

JOSEPH CONLEY.

Witnesses:
J. C. LIGGETT,
F. P. GOTT.